Oct. 30, 1962 P. L. MYER 3,060,799
TICKER TAPE PROJECTION SYSTEM
Filed March 6, 1961 3 Sheets-Sheet 3

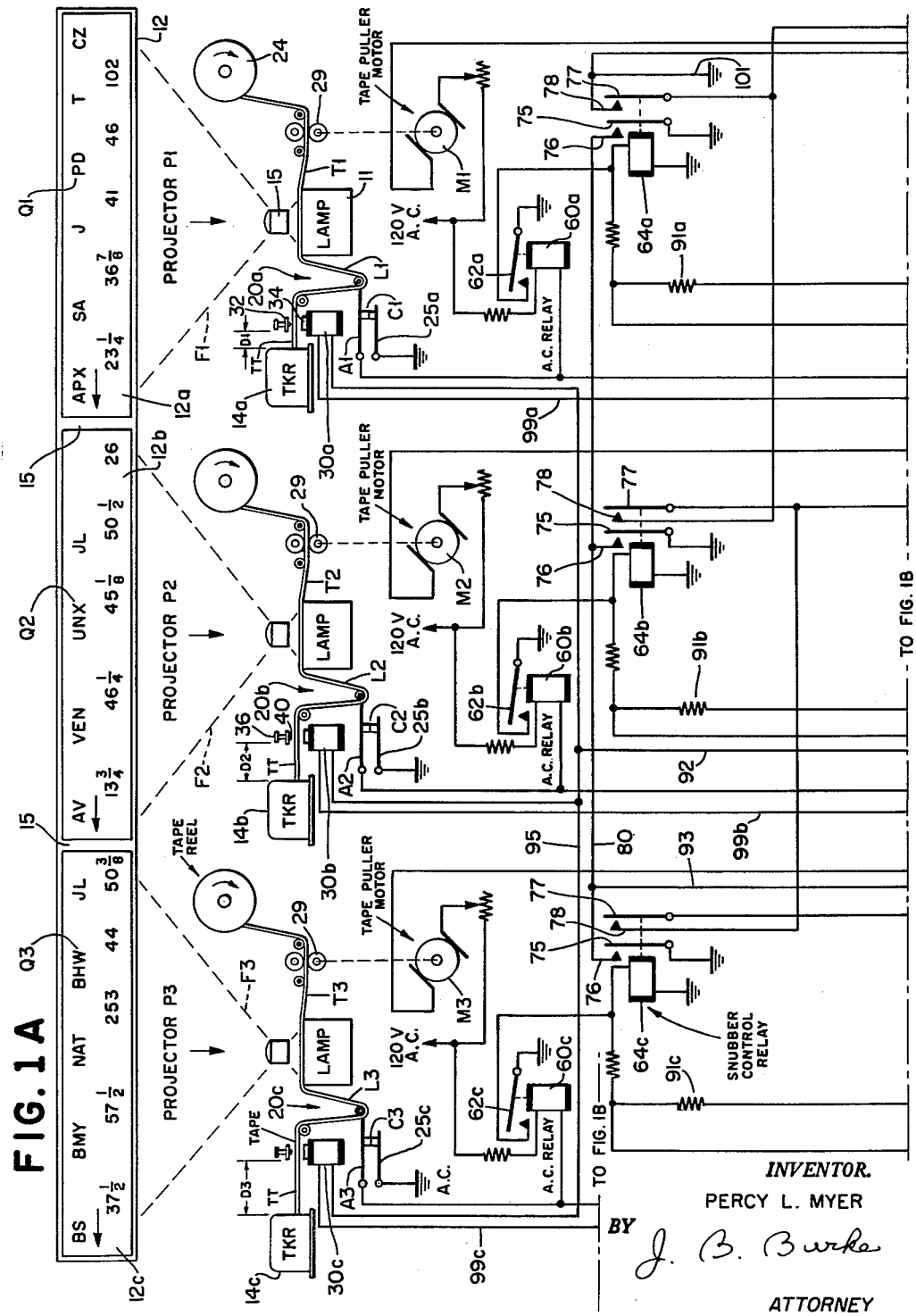

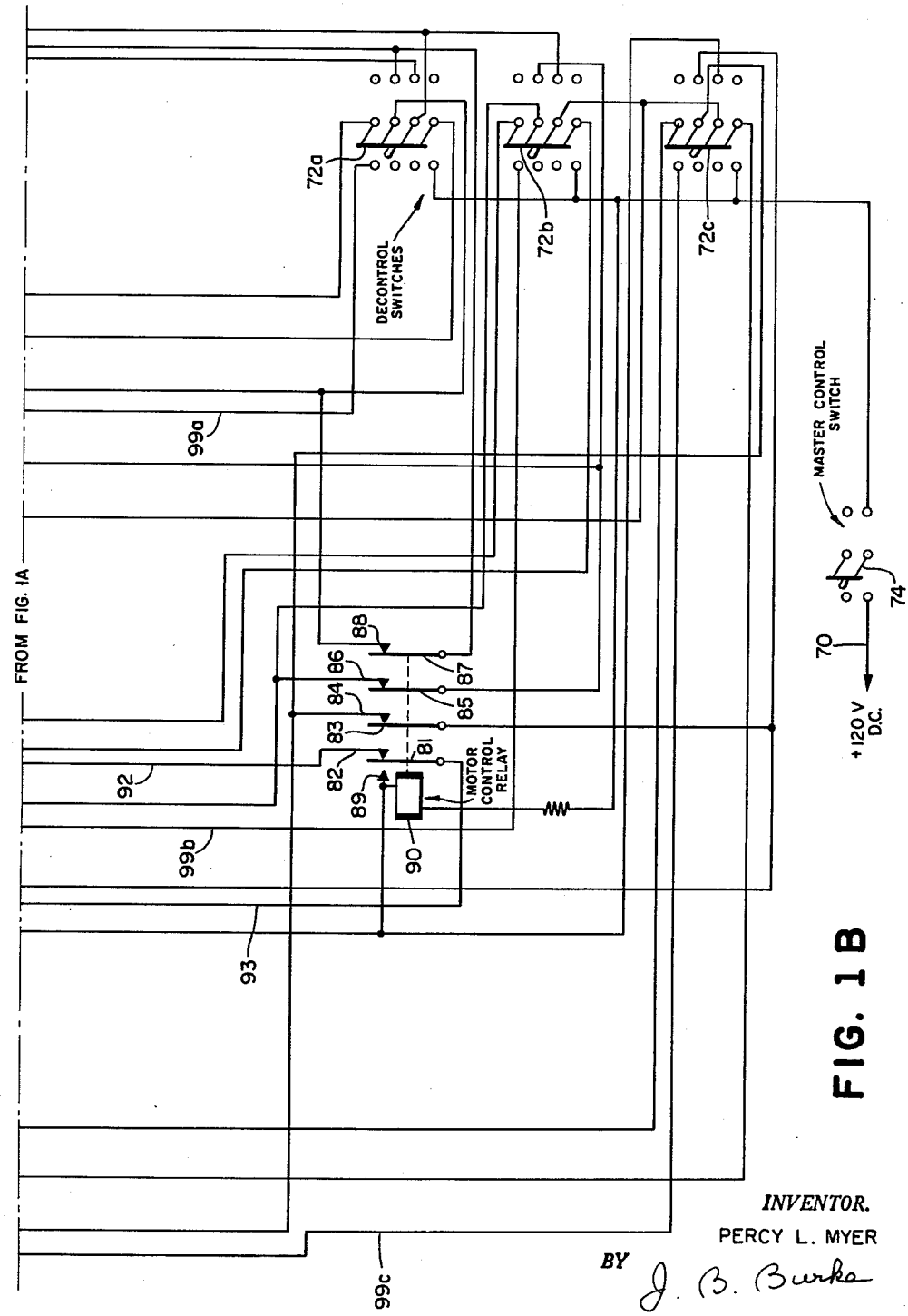

INVENTOR.
PERCY L. MYER
BY J. B. Burke
ATTORNEY

3,060,799
TICKER TAPE PROJECTION SYSTEM
Percy L. Myer, Caldwell, N.J., assignor to The Western Union Telegraph Company, New York, N.Y., a corporation of New York
Filed Mar. 6, 1961, Ser. No. 93,549
6 Claims. (Cl. 88—24)

This invention concerns a ticker tape projection system.

In brokerage offices it is conventional to project stock quotations upon a wall mounted projector screen which is generally about five to ten feet long. During periods of high market activity the tape issues quickly from the ticker and the projected quotations move rapidly across the screen. Frequently the quotations move so quickly that it is difficult to read and note the quotations before they pass off the screen. A need has long existed for some means of retaining the quotations for a longer period on the screen. It is not feasible optically to project more than a few inches of tape upon a standard size screen, otherwise the size of the letters and numerals on the tape must be reduced in size.

It is one object of the present invention to provide a projection system in which a plurality of projectors are arranged in series to project ticker tape quotations upon a series of screens several times longer than a conventional screen.

A further object is to provide a projection system of the character described, wherein quotations from a plurality of ticker tapes are projected upon associated respective screens arranged in series, the tapes being provided with drive means so that the projected quotations move and stop simultaneously on all of the screens.

Still another object is to provide a snubber device associated with each of the tickers to bring all of the tapes into register on the screens so that the combined display is that single series of quotations appearing sequentially on the ticker tapes.

Another object is to provide a novel drive control system for ticker tape.

The invention will be better understood from the following detailed description taken together with the drawing wherein:

FIGS. 1A and 1B taken together show diagrammatically a system embodying the invention.

Figure 2:
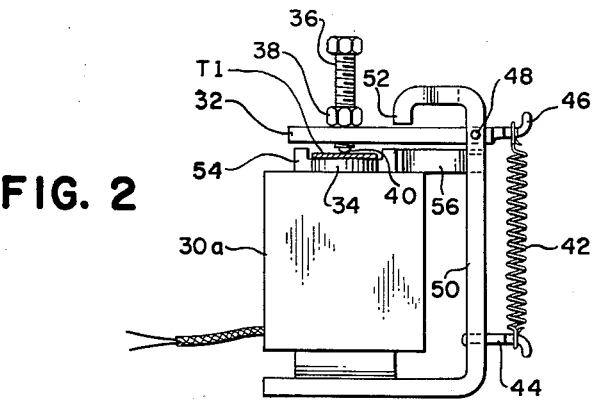
FIG. 2 is a side elevational view of a snubber device employed in the system.

Referring to FIGS. 1A and 1B, there is shown a plurality of optical projectors P1, P2, P3 that are arranged in series to project ticker tape quotations upon a screen 12 several times longer than a conventional screen. The screen has a series of sections 12a, 12b, 12c juxtaposed end-to-end. Each projector includes a lamp 11 and a lens system 15. Associated with each projector is an individual ticker 14a, 14b and 14c and a tape pulling device 20a, 20b, 20c which draws the tape T1, T2, T3 across the projection field of the projector. Each tape pulling device includes a drive roller 29 driven by a motor M1, M2, M3. The tape is taken up on a driven reel 24. Each motor is normally controlled by a mercury switch 25a, 25b, 25c. The mercury switch is actuated by a loop L1, L2, L3 of tape between the ticker and the optical projector. The switch has normally closed contacts C1, C2, C3. When any tape T1–T3 becomes taut it raises the arm A1, A2, A3 of the mercury switch and opens contacts C1, C2 or C3 which opens the circuit of the tape pulling motor M1, M2, M3 to stop the motor and prevent breaking of the tape. As more tape is fed out by the ticker the arm of the mercury switch drops and closes the switch and the tape puller motor starts again. The tape puller motor always pulls the tape faster than it is being fed out of the ticker. Thus there is on the screen section 12a, 12b, 12c an intermittent movement of the tape. It moves and stops according to the closing and opening of the associated switch 25a, 25b, 25c.

A plurality of two or more projectors P1–P3 are arranged in series. The tickers are spaced at different intervals D1, D2, D3 with respect to their associated projectors. Since the screens 12a–12c are disposed in series the projections Q1, Q2, Q3 of quotations appear as one continuous extended display of the contents of one tape. The quotations start at the right end of the right hand screen 12a and move across the screens 12b, 12c in succession. This gives an observer a longer period of time to look at a particular quotation as it travels across a series of screen sections or he may see many more quotations on the extended screen display at the same time.

Figure 3:
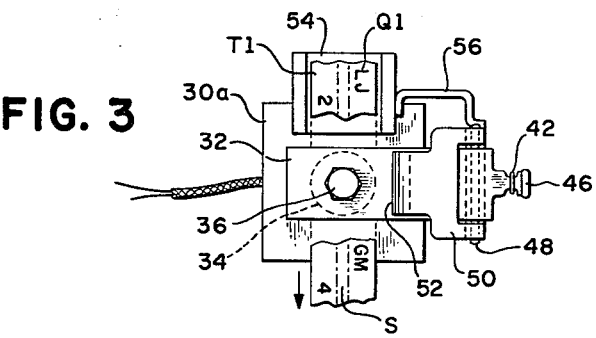
FIG. 3 is a top plan view of the snubber device.

The tapes T1, T2, T3 of each projection station move and stop simultaneously, otherwise the optical effect is distracting and disturbing to the observer. The control system for the tape drive motors functions to start and stop the motors simultaneously or substantially simultaneously. Since it is practically impossible to have two or more tickers feed out exactly the same amount of tape for a given number of quotations, provision is made to correct for this variation as it may occur. The tape pulling motors M1–M3 which are switched on and off do not have exactly the same starting and stopping times. The mercury switches 25a–25c do not all operate at exactly the same angle of tilt. All these diverse and variable factors are compensated for in the present system to keep the tapes moving in a uniform manner. The tape motor control arrangement according to the invention is devised to bring all tapes into register (i.e. correct relationship one to the other) each time any one of the motors M1–M3 is stopped by the associated tapes becoming taut. To bring the projected display of all tapes into register, a tape snubbing magnet 30a, 30b, 30c is mounted between each of the tickers 14a–14c and the tape loop L1–L3 which actuates the mercury switch 25a–25c. The tape is passed between the armature 32 and the pole 34 of this magnet; see FIGS. 1A, 2 and 3. The armature carries an adjustable screw 36 secured by a nut 38. The screw has a rounded end 40 which frictionally engages the tape in the narrow central space S between the printed letter and numeral quotations on the tape, when the armature is pulled down by the energized magnet. Normally the armature is raised by spring 42 secured at its ends between stationary pin 44 and the end 46 of armature 32 extending beyond the pivot pin 48 of the armature. Bracket 50 extends laterally of the body of the magnet to support both pin 44 and the armature 32. The bracket has a free end 52 turned down to act as a stop limiting upward movement of the armature 32. The tape is drawn from the ticker through a channel-shaped guide member 54 supported on the magnet body and bracket by arm 56.

When the snubber magnet 30a–30c is energized the snubber member 36 engages the tape and holds it so that the tape pulling motor M1, M2 or M3 pulling the tape will shorten the tape loop L1, L2 or L3 to open the mercury switch 25a, 25b or 25c and stop the tape pulling motor. Suppose images of three tapes T1, T2, T3 move across three screens 12a, 12b, 12c from right to left as shown in FIG. 1A. This is accomplished by three projectors P1–P3 similarly disposed from right to left. The right or first projector P1 has its associated ticker 14a set as close to the field F1 of vision as is reasonably possible and still provide the necessary space for the snubber magnet 30a and the loop U of tape T1 for actuating the mercury switch 25a which opens the circuit to the tape puller motor when the tape becomes taut. This minimum spacing is indicated as D1 in FIG. 1A.

The next projector to the left or second projector P2 has its ticker 14b spaced from its snubber magnet 30b at a greater distance D2 than in the right projector P1 by an amount that is equivalent to that length of tape T1, T2, T3 that appears in the field of vision of the projector. It will be understood that the same length of tape is projected in each of the fields F1, F2, F3.

The third projector P3 to the left of the second projector P2 has its ticker 14c spaced from the snubber magnet 30c at a greater distance D3 than in the first projector by an amount that is equivalent to double the length of tape that appears in any field of vision F1–F3.

The snubber magnet 30 is mounted on bracket 50, as above mentioned this bracket may be attached to the housing of lamp 11 of the projector. Tape from each ticker passes between the armature 32 and pole 34 of the snubber magnet and then over tape guide 54 to loop L1–L3 around actuating arm A1–A3 of the mercury switch. The rounded point 40 of screw 36 mounted in the center of the armature engages the tape at S to push it against the pole 34 of the snubber magnet. Since the screw engages the clear middle area of the tape, smearing of the fresh ink on the printed tape is avoided. When the snubber magnet is energized it holds the tape at that point. As the puller motor M1, M2, M3 continues to operate, the tape loop L1–L3 is taken up, raising the arm of the switch until the normally closed mercury contact C1, C2 or C3 opens and the motor stops.

When the snubber magnet 30a, 30b or 30c is energized, the associated ticker 14a, 14b or 14c may keep on working and the tape fed out by the ticker will appear as slack at TT in space D1, D2 or D3 between the ticker and the snubber magnet. This slack tape is taken up as soon as the associated snubber magnet is deenergized.

The tape puller motors M1, M3 are geared to operate tape pulling wheel 29 faster than the tapes are fed out by the tickers. Thus the arm A1, A2 or A3 of the mercury switch is always riding on the tape and there is normally no slack at TT between each ticker and its snubber magnet.

When all snubber magnets are energized at the same time, all tapes are held in their correct relative position. The motors of all the tape pullers will be stopped and the tapes will be held in register, i.e., in correct relative positions.

As the snubber magnets are released, any slight accumulated slackness in the respective tapes, between each ticker and its snubber magnet, is taken up as the switch actuating arms A1–A3 drop to close the mercury switches 25a–25b. Since all mercury switches would not normally close at the same time, when the snubber magnets are released, it is necessary to ascertain that time when all the mercury switches have closed and then close all motor circuits simultaneously.

To determine the operating status of the mercury switches before closing of the motor circuits there is connected to each mercury switch an alternating current relay 60a, 60b or 60c which is independent of the tape puller motor M, M2 or M3 and so connected to the mercury switch that it follows independently the action of the mercury switch; see FIG. 1A. This relay 60a, 60b or 60c is always energized when the contacts of the associated mercury switch are closed, and is deenergized when the contacts of the mercury switch are opened.

The contacts 62a, 62b and 62c of the relay 60a, 60b and 60c are connected in a manner to short circuit the winding of an associated snubber control relay 64a, 64b or 64c whenever the relay 60a, 60b or 60c is energized. The winding of the snubber control relay is connected to ground and to battery at 70 via normally closed switches 72, 72b, 72c and 72d, see FIG. 1B. However, the windings of relay 64a, 64b and 64c are energized only when the associated relay 60a, 60b, 60c is deenergized. Hence when its associated mercury switch is opened the relay 60a, 60b or 60c is deenergized and the snubber control relay is energized. When the mercury switch is closed, relay 60a, 60b or 60c is energized and the snubber control relay is deenergized.

Each snubber control relay 64a–64c is provided with two "make" contact assemblies 75, 76 and 77, 78. A ground is applied to the tongue 75 of each relay. The front contacts 76 associated with the tongues 75 of the snubber control relays are all connected together by line 80, and through line 93, tongue 81 and its associated back contact 82 of a motor control relay 90 and lines 92, 95 to the windings of all the snubber magnets 30a–30c. Each snubber magnet winding is further connected via line 99a, 99b or 99c to battery 70 through its individual resistor 91a, 91b, 91c. It is thus seen that when in normal operation any one of the mercury switches 25a, 25b, 25c is opened by its taut tape all snubber magnets 30a–30c are energized and all mercury switches 25a–25c are subsequently opened and all tape puller motors M1–M3 stopped. Also all snubber control relays become energized, and when this condition occurs a series circuit is established from ground at point 101 through the front contacts 78 and tongues 77 of all the snubber control relays to energize the motor control relay 90.

When the motor control relay 90 is energized it introduces an opening in addition to the opening of the contacts of the mercury switch in each of the tape puller motor circuits. This prevents the motor circuits from being closed for operation until the motor control relay 90 is deenergized.

When the motor control relay 90 is energized its contacts 83, 84, 85, 86, 87, 88 open to open the circuits of all the relays 60a, 60b, 60c. At the same time contacts 82, 89 close to apply a holding ground to the winding of the motor control relay 90 via wires 93 and 80 and closed contacts 75, 76 of relays 64a–64c. This holding ground is maintained until all snubber control relays 64a–64c have become deenergized.

With the release of the snubber magnets 30a–30c and the closing of all mercury switches 25a–25c with the resultant deenergizing of all the snubber control relays 64a–64c the holding ground is removed from the motor control relay 90 as contacts 75, 76 open. Relay 90 becomes deenergized and the drive circuits of all motors M1–M3 close simultaneously. Battery 70 for operation of the control relays is provided through master control switch 74. When the switch 74 is opened it removes all the controls and each of the tape puller motors M1–M3 will operate independently with no snubber action.

An individual control 72a, 72b and 72c switch may be provided for each projector so that if it is desired to remove the control from any one projector it may be conveniently done by opening the switch to its off position. When the individual switch is thrown to off position it opens the connection to the associated snubber magnet 30a, 30b or 30c, and removes battery from the associated snubber magnet and its snubber control relay. Is also shorts the associated motor circuit contacts 82, 83, 84, 85, 86, 87 of the motor control relay 90 to restore normal motor operation, and closes the circuit through a tongue 77 and front contact 78 of the associated snubber control relay 64a, 64b or 64c.

If all tickers 14a–14c are running and all tape puller motors M1–M3 are operating, then when the tape at one projector becomes taut it opens the mercury switch 25a, 25b or 25c. This allows the snubber control relay 64a, 64b or 64c to become energized. All snubber magnets 30c are energized and following this, all mercury switches are opened and all motors M1–M3 are stopped. The motor control relay 90 is energized and locks up. All motor circuits are now opened at a second point i.e. open contacts of relay 90. All snubber magnets are deenergized releasing the tapes T1–T3. All mercury contacts C1–C3 are closed and all snubber control 64a–

64c relays are deenergized. The motor control relay 90 is now deenergized closing all motor circuits. All motors M1–M3 start together and continue to pull tape until one of the mercury switches 25a, 25b or 25c is opened by taut tape when the above cycle is repeated.

The system has been described in connection with three projectors, it will be apparent that two, three or more projectors and associated control circuits may be employed in the system. The screen 12 will have as many sections as there are projectors. The screen 12 can be flat or the several sections can be angularly disposed to each other; for example each screen section can be placed on a different wall of a room with the separators 15 located at the corners or junctions of the walls. If screen 12 has four sections, the sections can be extended to form a continuous rectangular ring all around a room.

Figure 4:
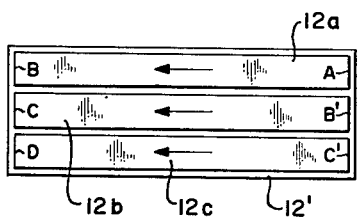
FIGS. 4 and 5 are diagrams of alternative projection screen arrangements according to the invention.

In FIG. 4 is illustrated an alternative arrangement of the display in which screen 12′ has its three sections 12a–12c located one above the other. The quotations will initially appear at end A of screen section 12a, travel to the left to end B, then continue at end B′ at the right end of screen section 12b, travel to C at the left, then continue at C′ at the the right end of lower screen section 12c and travel to D at the left end of the screen. This arrangement is advantageous since the display occupies a lesser horizontal space than the continuous screen. However the same advantage of a display of a longer length of the tape is accomplished.

Figure 5:
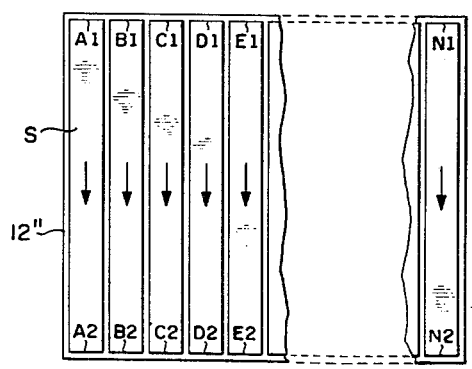

In FIG. 5 is illustrated another arrangement of the display in which screen 12′ has a multiplicity of screen sections S. The screen sections are vertically disposed and juxtaposed at the edges. The display of quotations may run from A1 to A2, then B1 to B2, C1 to C2, D1 to D2, E1 to E2 etc., to the final screen section running from N1 to N2.

In all arrangements the general purpose of increasing the number of quotations displayed and prolonging the time of display is accomplished.

Although a limited number of embodiments have been described, it will be understood that these are only exemplary of the invention. The invention is to be construed as coextensive with the broadest of the appended claims.

What is claimed is:

1. A ticker tape projection system, comprising a plurality of optical projection screens juxtaposed to each other, a plurality of tickers each producing simultaneously identical series of quotations on individual tapes, a plurality of optical projectors each projecting an image of a short length of an individual tape on a different one of the screens, means phasing the projection of the respective short lengths of the tapes on the respective screens so that the images on all the screens constitute a composite image of a continuous length of the tape, said means comprising an electromagnetic snubber device disposed near each projector and engaging the tape fed thereto, each of the devices being spaced a different distance from the ticker feeding the tape, the differences in the distances being substantially equal to the short lengths of tape, means for pulling the tapes past the snubber devices and projection positions of the several projectors, means controlling the tape pulling means to stop movement of the tapes substantially simultaneously, the last named means including a switch adjacent each snubber device, each switch having an arm engaged with a loop of the tape between the snubber device and adjacent projector, the switches having normally closed grounded contacts, a plurality of first relays each having a winding connected to a power supply and the normally closed contacts of the switches whereby the first relays are normally energized, each of the first relays having normally closed grounded contacts, a plurality of snubber control relays having windings connected to the closed grounded contacts of the first relay whereby the snubber control relays are deenergized, each snubber control relay having a pair of normally open contacts, one contact of said pair in each snubber control relay being grounded, the other contact in said pair in all the snubber control relays being connected together, each snubber device being in circuit with another power supply, with first and second normally closed contacts of a motor control relay and with the normally open pair of contacts of a different snubber control relay, whereby the opening of any one switch occurring on the raising of its arm by a taut loop of tape deenergizes one of the first relays, energizes one of the snubber control relays, and energizes all of the snubber devices so that passage of all the tapes over the snubber devices is stopped.

2. A system according to claim 1, wherein the tape pulling means includes a plurality of drive motors respectively connected in circuit with the normally closed contacts of a different one of said switches, whereby opening of any one switch opens the last named circuit to stop the drive motor connected thereto and all the other drive motors stop as the energized snubber devices stop the tapes and raise the arms of the switches to open the contacts.

3. A system according to claim 2, wherein the means for controlling the tape pulling means further includes a plurality of other pairs of normally closed contacts in said motor control relay, each of said other pairs of contacts being in circuit with a different one of the drive motors, said motor control relay having a winding normally deenergized and connected to an open third contact of the motor control relay, said snubber control relays having other pairs of normally open serially connected and grounded contacts, said third contact being connected to last named pairs of contacts, whereby said motor control relay becomes energized when the snubber control relays become energized, and the first and second contacts of the motor control relay open to deenergize all snubber devices, while the first and third contacts of the motor control relay close to apply a ground to the winding of the motor control relay and keep it energized, the other pairs of closed contacts of the motor control relay opening when the motor control relay is energized to hold open the circuits of the drive motors, the arms of the switches being released by lengthening loops of tapes when the snubber devices are deenergized to close all the switch contacts, deenergize all the snubber control relays, and deenergize the motor control relay, whereupon all motor circuits close and the motors start in unison to pull tape simultaneously.

4. Tape drive control means for starting and stopping pulling of tapes issuing from a plurality of tickers, comprising a plurality of tape pullers respectively disposed in the paths of travel of the tapes, a plurality of snubber devices respectively disposed in the paths of travel of the tapes in advance of the tape pullers for selectively stopping movements of the tapes to the tape pullers, a switch adjacent to each snubber device, each switch having an arm engaged with a loop of a tape terminating at one or the tape pullers, each of the switches having normally closed ground contacts, a plurality of first relays each having a winding connected to a power supply and the normally closed contacts of the switches, whereby the first relays are normally energized, each of the first relays having normally closed grounded contacts, a plurality of snubber control relays having windings connected to the closed grounded contacts of the first relay whereby the snubber control relays are deenergized, each snubber control relay having a pair of normally open contacts, one contact of said pair being grounded in each snubber control relay, the other contact in said pair in all the snubber control relays being connected together, each snubber device being in circuit with another power supply, with first and second normally closed contacts of a motor control relay and with the normally open pair of contacts of a different snubber control relay, whereby the opening of any one switch occurring on the raising of its arm by a taut loop of tape deenergizes one of the first relays, energizes one of the snubber control relays, and energizes all of the snubber devices so that passage of all the tapes over the snubber devices is stopped.

5. Tape drive control means according to claim 4, further comprising drive motors for the tape pullers respectively connected in circuit with the normally closed contacts of a different one of said switches, whereby opening of any one switch opens the last named circuit to stop the drive motor connected thereto and all the other drive motors stop as the energized snubber devices stop the tapes and raise the arms of the switches to open their contacts.

6. Tape drive control means according to claim 5, further comprising a plurality of other pairs of normally closed contacts in said motor control relay, each of said other pairs of contacts being in circuit with a different one of the drive motors, said motor control relay having a winding normally deenergized and connected to an open third contact of the motor control relay, said snubber control relays having other pairs of normally open serially connected and grounded contacts, said third contact being connected to last named pairs of contacts, whereby said motor control relay becomes energized when the snubber control relays become energized and the first and second contacts of the motor control relay open to deenergize all snubber devices, while the first and third contacts of the motor control relay close to apply a ground to the winding of the motor control relay and keep it energized, the other pairs of closed contacts of the motor control relay opening when the motor control relay is energized to hold open the circuits of the drive motors, the arms of the switches being released by lengthening loops of tape when the snubber devices are deenergized to close all the switch contacts, deenergize all the snubber control relays, and deenergize the motor control relays, whereupon all motor circuits close and the motors start in unison to pull tape simultaneously.

References Cited in the file of this patent

UNITED STATES PATENTS

| | | |
|---|---|---|
| 1,666,304 | Proctor | Apr. 17, 1928 |
| 1,868,889 | Eitzen | July 26, 1932 |
| 1,942,748 | Ybarrondo | Jan. 9, 1934 |
| 1,945,522 | Eitzen | Feb. 6, 1934 |
| 1,960,577 | Dirkes | May 29, 1934 |
| 2,025,679 | Dirkes et al. | Dec. 24, 1935 |
| 2,280,943 | Ferm | Apr. 28, 1942 |